Aug. 26, 1924.
J. J. HRUSKA
BEET HARVESTER
Filed Oct. 22, 1920
1,505,957
2 Sheets-Sheet 2
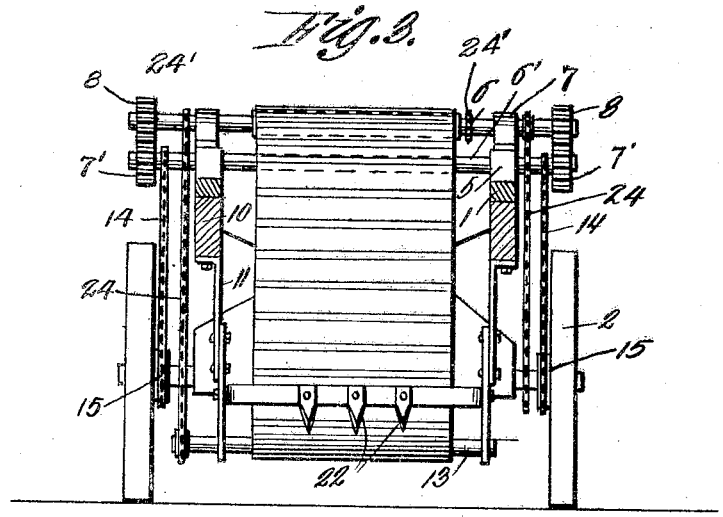
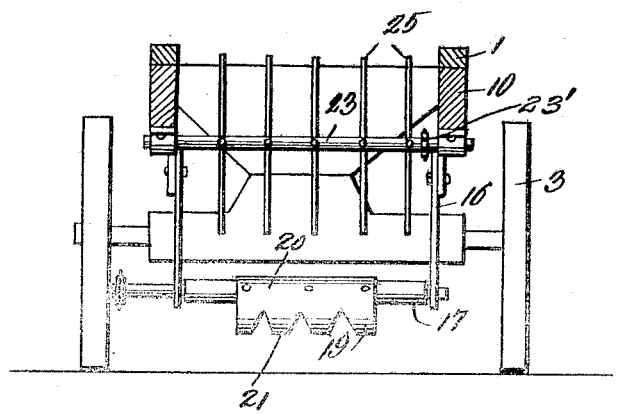
JOSEPH J. HRUSKA INVENTOR.

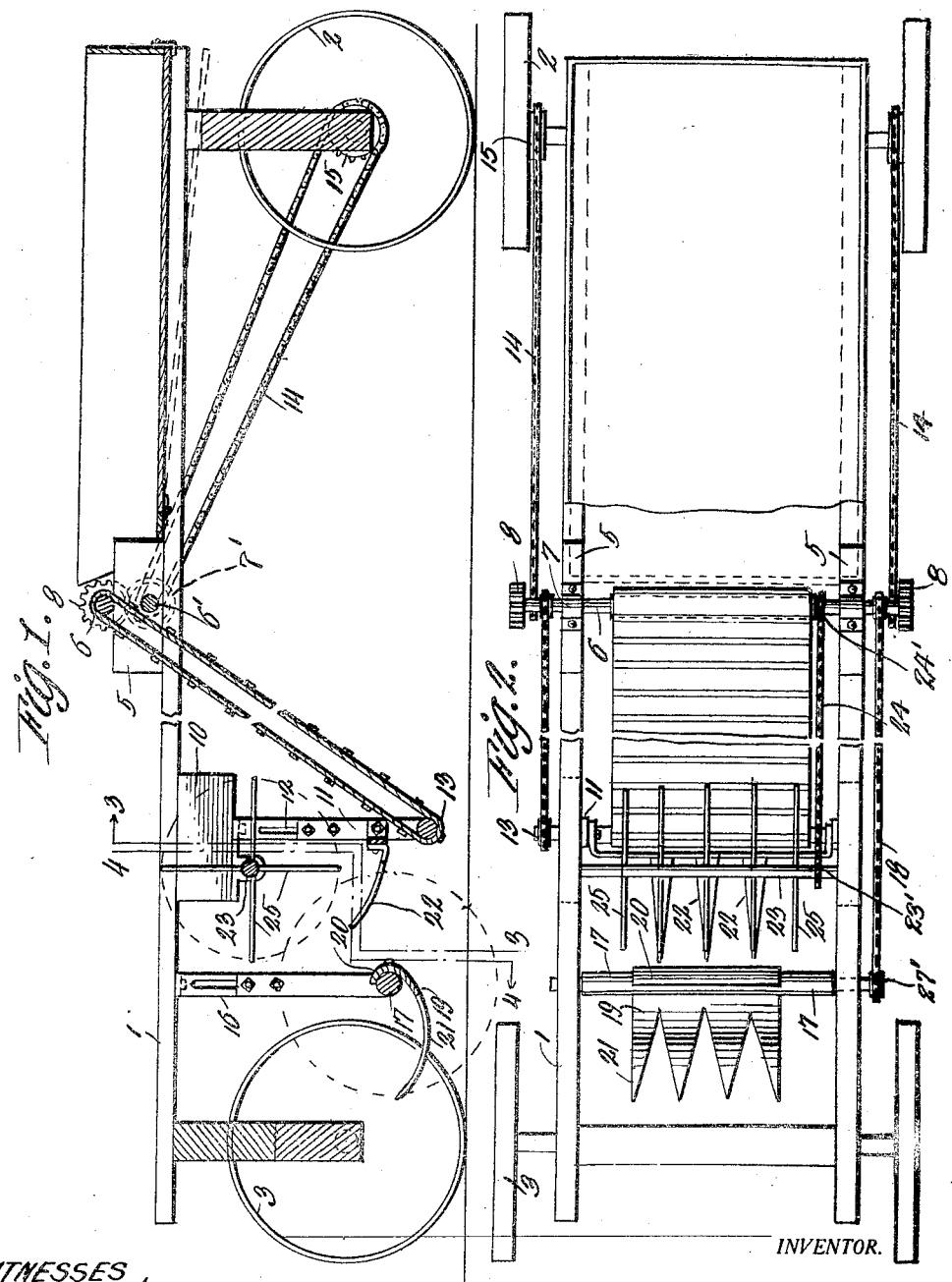

Patented Aug. 26, 1924.

1,505,957

UNITED STATES PATENT OFFICE.

JOSEPH J. HRUSKA, OF MILWAUKEE, WISCONSIN.

BEET HARVESTER.

Application filed October 22, 1920. Serial No. 418,688.

*To all whom it may concern:*

Be it known that I, JOSEPH J. HRUSKA, a citizen of the United States, residing at Milwaukee, in the county of Milwaukee and State of Wisconsin, have invented certain new and useful Improvements in a Beet Harvester, of which the following is a specification.

This invention relates to an improved beet harvester and the principal object of the invention is to provide improved means for lifting the beets out of the ground and throwing them upon a conveying mechanism so that they may be conveyed to a desired receptacle carried by the harvester.

A still further object of the invention resides in providing a harvester of this character which will be extremely simple and inexpensive in construction, which is composed of but few simple and readily assembled parts, the various parts being so constructed and assembled as to minimize the opportunity of poor wear, breakage, or derangement, which is easy and positive of operation, which facilitates the digging operation of the beets and will prove thoroughly efficient and practical in its operation.

With these objects in view together with others which will appear as the description proceeds, the invention resides in the novel formation, combination and arrangement of parts, as will be described more fully hereinafter, illustrating in the drawings and particularly pointed out in the claim.

In the drawing:—

Figure 1 is a vertical section taken through the harvester,

Figure 2 is a top plan view of the harvester,

Figure 3 is a section taken on the line 3—3 of Figure 1 looking in the direction of the arrow, Figure 4 is a section taken on the line 4—4 of Figure 1.

Referring to the drawing in detail it will be seen that 1 designates the frame of the harvester which may be of any preferred construction and as shown consists of two parallel side strips which are connected with the usual end strips. This frame 1 is mounted upon the rear wheels 2 and the front steering wheels 3 in any preferred or well known manner.

Intermediate the side rails of the frame 1 there are mounted the blocks 5 which have journalled therethrough a shaft 6' provided with cog wheels 7' at its end. Another shaft 6 is mounted in the journals 7 upon the tops of the blocks 5 and is also provided with the cog wheels 8 at its ends which mesh with the cog wheels 7' on the shaft 6'. Another pair of blocks 10 are mounted between the forward end of the frame 1 and the blocks 5. Brackets 11 depend from the blocks 10 and these brackets are made in two pieces one piece having a slot 12 for receiving the bolt of the other piece and thus it will be readily seen that these brackets are vertically adjustable. A drive chain 14 passes over a sprocket provided upon the shaft 6' and also over a sprocket 15 provided upon one of the rear wheels 2 of the harvester. There is a chain 14 upon each side of the frame as will be readily seen by referring to Figure 2 of the drawing. Between the forward end of the frame 1 and the blocks 10 there are situated vertically adjustable brackets 16 having a shaft 17 journalled in their lower ends. This shaft 17 is provided at one end with a sprocket wheel 27' for receiving the sprocket chain 18 which passes over a sprocket wheel provided upon the shaft 6 so that upon the rotation of this shaft 6 the shaft 17 will rotate in a like direction. A digger 19 is mounted upon the shaft 17 and consists of the body portion 20 which is curved around and fixed to the shaft 17. The blade portion of the digger consists of a plurality of pointed fingers 21 which are arcuate in longitudinal cross section as is shown in Figure 1. The rotation of these fingers 21 is indicated by a dotted line circle in Figure 1 and it will be readily seen that they will penetrate a desired distance into the ground so as to lift the beets therefrom by a scooping process. A plurality of cleaning teeth 22 are mounted upon a rod which is connected to the bracket 11 and are shaped so as to substantially fill the space between the fingers 21 of the digger 19 and thus will prevent the dirt from clogging therein and when the digger is about to scoop into the ground the same will be cleaned of all dirt which it may have collected upon its former scoop.

A shaft 23 is journaled in the blocks 10 so as to be situated forward of the brackets 11 and is provided with a sprocket wheel 23' at one end thereof so as to receive the chain 24 which passes over a sprocket wheel 24' mounted upon the shaft 6 and thus upon rotation of this shaft 6 the shaft 23 will be rotated in a direction opposite to that in which shaft 17 rotates. A plurality of radiating rods 25 are mounted upon the shaft 23 and are positioned so as to pass between the fingers 21 of the digger 19 and thus when the shafts 17 and 23 are operated by the shaft 6 the beets which are lifted from the ground by the digger 19 will be knocked therefrom so as to be thrown upon the conveyor 9 and will then be delivered to the receptacle 4. Of course it will be readily understood that there may be as many of the diggers 19 mounted upon the shaft 17 as may be found desirable and that the height of the shaft 17 from the ground will depend upon the depth of the beets and other circumstances which may be encountered.

From the foregoing description, taken in connection with the accompanying drawings, the construction and operation of this harvester will be readily understood without a more extended explanation. As numerous changes in form, proportion, and in the minor details of construction may be resorted to without departing from the spirit of this invention, I do not wish to be limited to the construction herein shown and described other than as claimed.

Having thus described my invention what I claim as new is:—

In a beet harvester, an extracting mechanism including a rotatable shaft, a digger mounted on said shaft and comprising a body portion curved concentrically with the shaft and fixed thereto, and a plurality of spaced fingers extending therefrom and curved throughout their length, said fingers being curved in the same direction in which said shaft is adapted to rotate for digging the beets from the ground, a second shaft to the rear of said extension mechanism, and a plurality of radiating bars extending from said second shaft, said bars being situated so as to pass between the fingers of the digger and knock the beets therefrom so as to throw the same rearwardly.

In testimony whereof I affix my signature in presence of two witnesses.

JOSEPH J. HRUSKA.

Witnesses:
  F. J. REICKS,
  C. M. HAMBRIGHT.